(12) United States Patent
Bourque

(10) Patent No.: US 8,139,515 B2
(45) Date of Patent: Mar. 20, 2012

(54) DEVICE AND METHOD OF MANAGING DATA COMMUNICATIONS OF A DEVICE IN A NETWORK VIA A SPLIT TUNNEL MODE CONNECTION

(75) Inventor: Francis P. Bourque, Mundelein, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1072 days.

(21) Appl. No.: 11/965,349

(22) Filed: Dec. 27, 2007

(65) Prior Publication Data
US 2009/0170496 A1 Jul. 2, 2009

(51) Int. Cl.
*H04H 20/71* (2008.01)
(52) U.S. Cl. ........ 370/312; 370/328; 370/331; 370/338; 370/392; 370/401; 455/410; 709/224; 709/227; 709/238
(58) Field of Classification Search ............ 455/410, 455/422.1, 432.2, 433, 456.3; 370/312, 321, 370/328, 332, 338, 340, 389; 709/223, 225–229, 709/238
See application file for complete search history.

(56) References Cited

U.S. PATENT DOCUMENTS

| | | | | |
|---|---|---|---|---|
| 7,200,658 B2 * | 4/2007 | Goeller et al. | | 709/224 |
| RE41,030 E * | 12/2009 | Pham et al. | | 709/228 |
| 2004/0170181 A1 * | 9/2004 | Bogdon et al. | | 370/400 |
| 2006/0092916 A1 * | 5/2006 | Harmon et al. | | 370/352 |
| 2006/0167894 A1 | 7/2006 | Wunner | | |
| 2007/0248085 A1 * | 10/2007 | Volpano | | 370/389 |
| 2009/0028155 A1 * | 1/2009 | Chen et al. | | 370/392 |
| 2009/0129301 A1 * | 5/2009 | Belimpasakis | | 370/310 |

FOREIGN PATENT DOCUMENTS

WO 2007058981 A2 5/2007

OTHER PUBLICATIONS

Man Li; Policy-Based IPSEC Management; Nokia Research Center Abstract; IEEE Network; Nov./Dec. 2003; pp. 36-43.

* cited by examiner

*Primary Examiner* — Dwayne Bost
*Assistant Examiner* — Inder Mehra

(57) ABSTRACT

A device and a method for managing data communications of a device in a network are provided. The method includes establishing a secure communication connection for the device with a service provider via a tunnel mode connection. A determination is then made whether the device is part of a trusted domain including one or more other devices. If the device is part of a trusted domain including one or more other devices, then a direct communication connection is established, which bypasses the tunnel mode connection for only the devices that are part of the same trusted domain. Communications with any devices which are not part of the same trusted domain are routed via the tunnel mode connection.

11 Claims, 5 Drawing Sheets

DEVICE AND METHOD OF MANAGING DATA COMMUNICATIONS OF A DEVICE IN A NETWORK VIA A SPLIT TUNNEL MODE CONNECTION

FIELD OF THE INVENTION

The present invention relates generally to a device and method for managing data communications of a device in a network, and more particularly, to the routing of data communications between a tunnel mode connection and a direct communication connection which bypasses the tunnel mode connection.

BACKGROUND OF THE INVENTION

Cellular communication carriers provide a relatively closed network environment with well defined points of access to the outside world, where subscribers can gain access to the network for making voice calls, sending text messages or otherwise communicatively accessing other points of interests. In essence many carrier networks are private networks, which are made available on a subscription basis. Such a policy provides greater opportunities for security, and allows the carriers to better control and/or police access to the network and the management of the flow of information supporting voice and data communications, which in turn better enables the carriers to provide security services, such as antivirus protection or parental control services.

More traditionally, cellular communication carriers' needed to access points outside of the relatively closed private network environment in instances in which voice communication calls needed to connect with a call destination that was not part of the carrier's network. In such instances, a gateway or interface node could provide access to the non-carrier controlled call destination via the POTS network and/or another carrier's network. More recently, data communications are becoming an increasing portion of the overall network traffic, and access to public data networks, such as the Internet, is becoming increasingly desirable for more and more of the data traffic as a data source, a data destination, and/or a portion of the routing. In some instances, a subscriber device might even access the carrier's network via a non-network controlled interface, such as a wireless LAN access point.

In such an instance, in order to maintain or enhance security, the subscriber device will often access the carrier network via a tunnel mode connection, which encapsulates private network information in a public network transmission unit. In essence, the private network data information, as well as the private network protocol information, appears to the public network as data encoded as part of the public network transmission unit, such as a packet. Often times the private network information is encrypted using a set of encryption keys that are known only by the data source and destination, which are part of the private network. In this way, a subscriber device can access the private network via a virtual private network that might extend through portions of a public network.

However, in some instances it may be desirable for the subscriber device to bypass the tunnel in order to communicate more directly with other trusted devices, which may or may not be otherwise accessible by the subscriber. One such example might include a media center, which could be used to store music, pictures and/or video, which has been created, is licensed and/or is owned by a subscriber, and which the subscriber may desire to access via a subscriber device, but not store on the subscriber device. Furthermore, it may be desirable to be able to synchronize subscriber data, such as contact information, and calendar appointments between a subscriber's multiple devices, such as a personal computer and a cellular telephone. In such instances, it may be beneficial to be able to download the content more directly, such as from the media server, or between the cellular telephone and the personal computer, especially in instances where one of the communicating devices might not be connected to the public network, and/or might not be otherwise accessible.

In other instances, it may be desirable to communicate the information directly and avoid the costs, that might be associated with communicating data via the carrier controlled network, and/or otherwise increase the traffic congestion on the carrier controlled network, when the intended communication partner is present within a trusted communication environment or a trusted portion of the network.

However, letting a subscriber device access any address outside of a tunnel mode connection is generally not acceptable for the carrier. Furthermore, a subscriber may not always know whether a communication partner is present within a trusted communication environment or a trusted portion of the network. Consequently, the present inventor has recognized that it would be beneficial if the subscriber device could automatically configure the management and routing of communication information between a tunnel mode connection and a more direct communication connection which bypasses the tunnel mode connection.

SUMMARY OF THE INVENTION

The present invention provides a method for managing data communications of a device in a network. The method includes establishing a secure communication connection for the device with a service provider via a tunnel mode connection. A determination is then made whether the device is part of a trusted domain including one or more other devices. If the device is part of a trusted domain including one or more other devices, then a direct communication connection is established, which bypasses the tunnel mode connection for only the devices that are part of the same trusted domain. Communications with any devices which are not part of the same trusted domain are routed via the tunnel mode connection.

In at least one embodiment, the devices that are part of the same trusted domain include devices that have a network destination address included in the one or more sets of addresses reserved for private networks.

In at least a further embodiment, the devices that are part of the same trusted domain include devices that have a network destination address where netmask bits of the network destination address are equivalent to the value of a local netmask and the network destination address is not equal to a network address of a gateway device for routing traffic away from the trusted domain.

In at least a still further embodiment, the devices that are part of the same trusted domain include devices that have a network destination address that is part of range of addresses that are part of a common domain authority.

The present invention further provides a device in a network. The device includes a network address, a network interface, and a communication controller coupled to the network interface. The communication controller includes a secure communication connection module for establishing a secure connection via a tunnel mode connection with a service provider via a network infrastructure. The communication controller further includes a trusted domain identification module for identifying any other devices that form a part of a trusted domain with the device. The communication controller still further includes a direct communication connection module for establishing a direct connection which bypasses the tunnel mode connection for communicating with any destination devices that are part of the same trusted domain. Further yet, the communication controller includes a routing module for alternatively routing any communication with the network via the secure communication connection and the direct communication connection dependent upon whether the destination device is part of the same trusted domain.

These and other features, and advantages of this invention are evident from the following description of one or more preferred embodiments of this invention, with reference to the accompanying drawings.

DETAILED DESCRIPTION OF THE PREFERRED EMBODIMENT(S)

Figure 1:
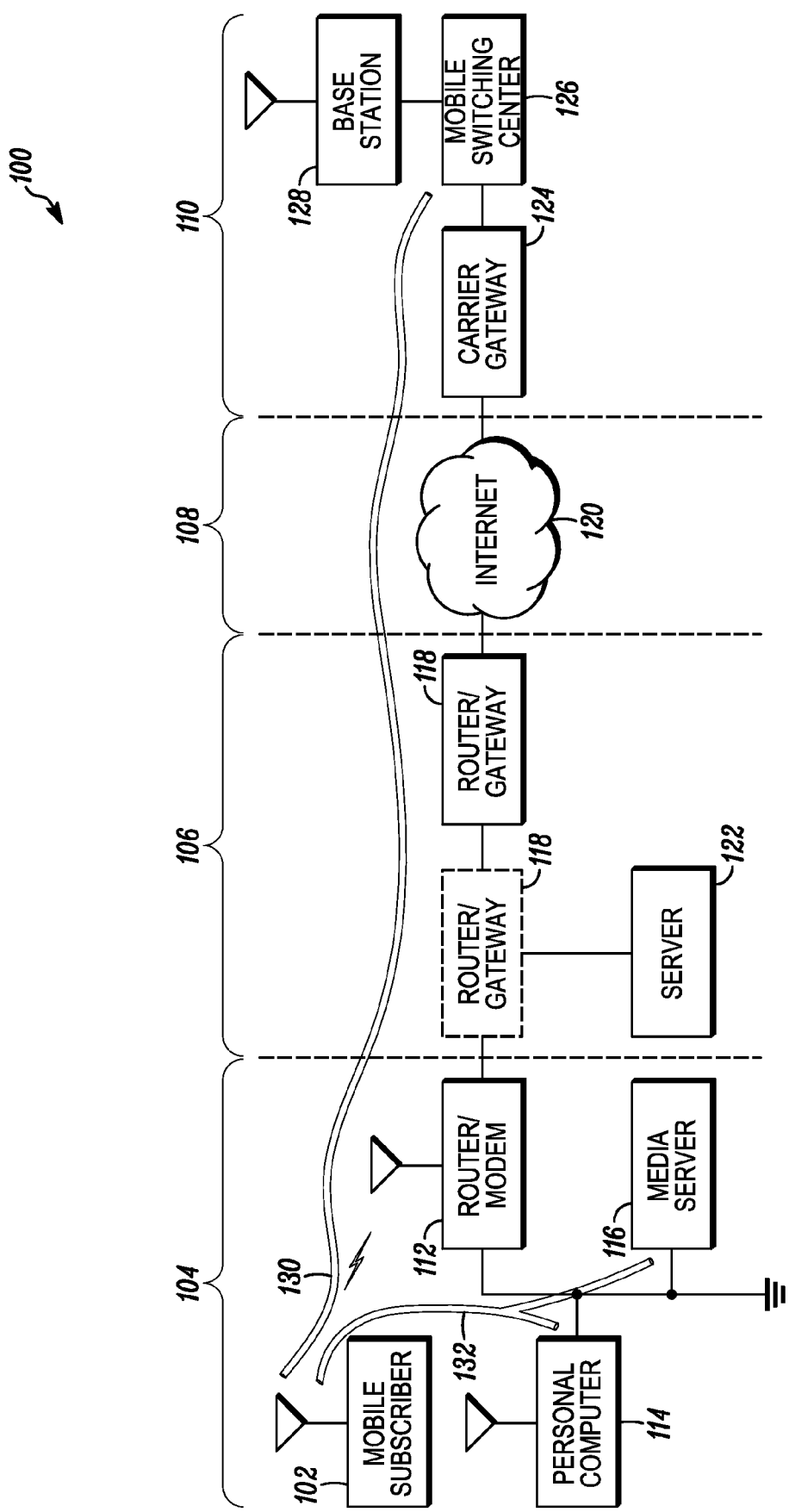
FIG. 1 is a block diagram of at least a portion of an exemplary network environment in which the routing of data communications of a device can be managed.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates a block diagram 100 of at least a portion of an exemplary network environment in which the routing of data communications of a device can be managed. The block diagram includes multiple regions, each having a potentially different level of trust relative to an end user device, such as a mobile subscriber 102. The exemplary network environment includes a first zone 104, which corresponds to an exemplary local area network area that might be managed and maintained by an end user; a second zone 106, which might be managed and maintained by an Internet service provider; a third zone 108, corresponding to the Internet; and a fourth zone 110, which might be managed and maintained by a wireless communication carrier.

In the illustrated embodiment, the first zone includes a router/modem 112, which might support a wireless communication protocol, such as IEEE 802.11 or IEEE 802.16. In addition to supporting communication with one or more wireless communication devices, typical wireless routers will often include one or more ports for coupling to other devices via a wired connection. Some wired connections, as well as possibly other wireless connections, will support further user managed devices, such as personal computers 114 and/or a media servers 116, while a further wired connection will often support an external network connection via a modem for accessing a non-user controlled portion of a network, which might directly and/or eventually connect to the Internet. In some instances, the modem can take the form of a cable modem, a DSL modem, and/or a dial up modem. In the illustrated embodiment, the router/modem 112 is coupled to a portion of the network managed by an Internet service provider.

In some instances, the Internet service provider may have one or more layers of routers/gateways 118, which may need to be traversed before any communication originating from one of the user controlled devices reaches the Internet 120, within which the Internet service provider may exercise an increased level of control, thereby potentially creating a greater degree of security, or potentially a zone of trust at least relative to the service provider. The Internet service provider may provide servers 122, that supply information to one or more of the user devices, in a manner where there is some level of trust. For example, the Internet service provider can provide access to an e-mail server, or a further media server, where messages and/or pictures could be remotely stored.

While in some instances, several of the one or more devices within the first zone 104 may have a public network address, in other instances some of the devices may need to share an address. In such an instance, a network address translation device, which is sometimes incorporated as part of the router/modem 112, can provide network address translation capabilities so as to enable a single network address to be shared by multiple devices for purposes of managing data requests from the multiple user devices relative to the network via the shared address, and for parsing out and delivering the network responses of the various requests to the particular devices responsible for making each of the requests.

In some ways, the Internet 120 is seen as not under anyone's direct control and/or correspond to a minimally managed portion of the network, in which much of the communication pathways are beyond the control of the message destination and the message originator, where almost anyone can observe the network traffic as it traverses across the network. Still further, there are other network entities and potentially other sources of information that may seek to intrude, obtain unauthorized access to, and possibly affect other parts of the network, and while much of the Internet participants may be benign, there are potentially a number of Internet participants which may have malicious and/or mischievous intent.

Also coupled to the Internet 120 is a carrier gateway 124 corresponding to the illustrated fourth zone 110, which as noted previously may represent a portion of the network having a connection to the Internet 120, that is maintained and managed by a wireless communication carrier, such as a wireless cellular communication service provider. The connection between the Internet 120 and the wireless cellular infrastructure enables data to pass between the two portions of the network. For example, the carrier gateway can be coupled to and/or include a packet data interface, such as a GPRS (general packet radio service) support node or a protocol control unit (not shown). In turn, the carrier network gateway is coupled to a mobile switching center (MSC) 126, and a base station 128 via the mobile switching center 126.

While a mobile subscriber 102, such as a cellular radio telephone might be capable of establishing a direct radio communication connection with the base station, there may be instances in which it is desirable to interact with the cellular network infrastructure through the Internet 120 (i.e. public packet data network). In such an instance, the wireless communication carrier may establish a tunnel connection 130 between the mobile subscriber 102 and the mobile switching center 126 via the Internet 120 and the carrier network gateway 124.

For at least some devices, such as a mobile subscriber 102 in the form of a cellular radio telephone which is a device associated with and linked to the carrier network, access to the packet data network has largely been facilitated through the carrier network infrastructure. This has traditionally been the case regardless as to whether the mobile subscriber 102 was communicating with the carrier network infrastructure via a direct wireless connection or via a tunnel connection 130 that traverses at least a portion of the public network. However, as noted above, there are instances in which it may be desirable to access other devices more directly via a direct connection 132, which bypasses the tunnel connection 130.

Alternatively, while the first zone 104 and second zone 106 have been described as potentially corresponding to a zone maintained and managed by a user (first zone) and a zone maintained and managed by an Internet service provider (second zone), the first zone 104 could correspond to a work place networking environment, corresponding to a first area in a first location, which is maintained and managed by a company, and the second zone 106 could correspond to further areas associated with a first location or areas associated with other business locations, which are similarly maintained and managed by the same company for supporting workplace communications within the company, or into and out of the company.

Furthermore, while the mobile subscriber has been described, in at least some instances as potentially corresponding to a cellular radio telephone, one skilled in the art will recognize that the mobile subscriber can take the form of other types of devices without departing from the teachings of the present invention. Further examples in addition to cellular and/or radio telephones without intending to be an exhaustive list include cordless telephones, paging devices, personal digital assistants, portable computers, pen-based or keyboard-based handheld devices, remote control units, audio players (such as an MP3 player), and video game players, which might similarly communicate with other devices through a network connection.

Figure 2:
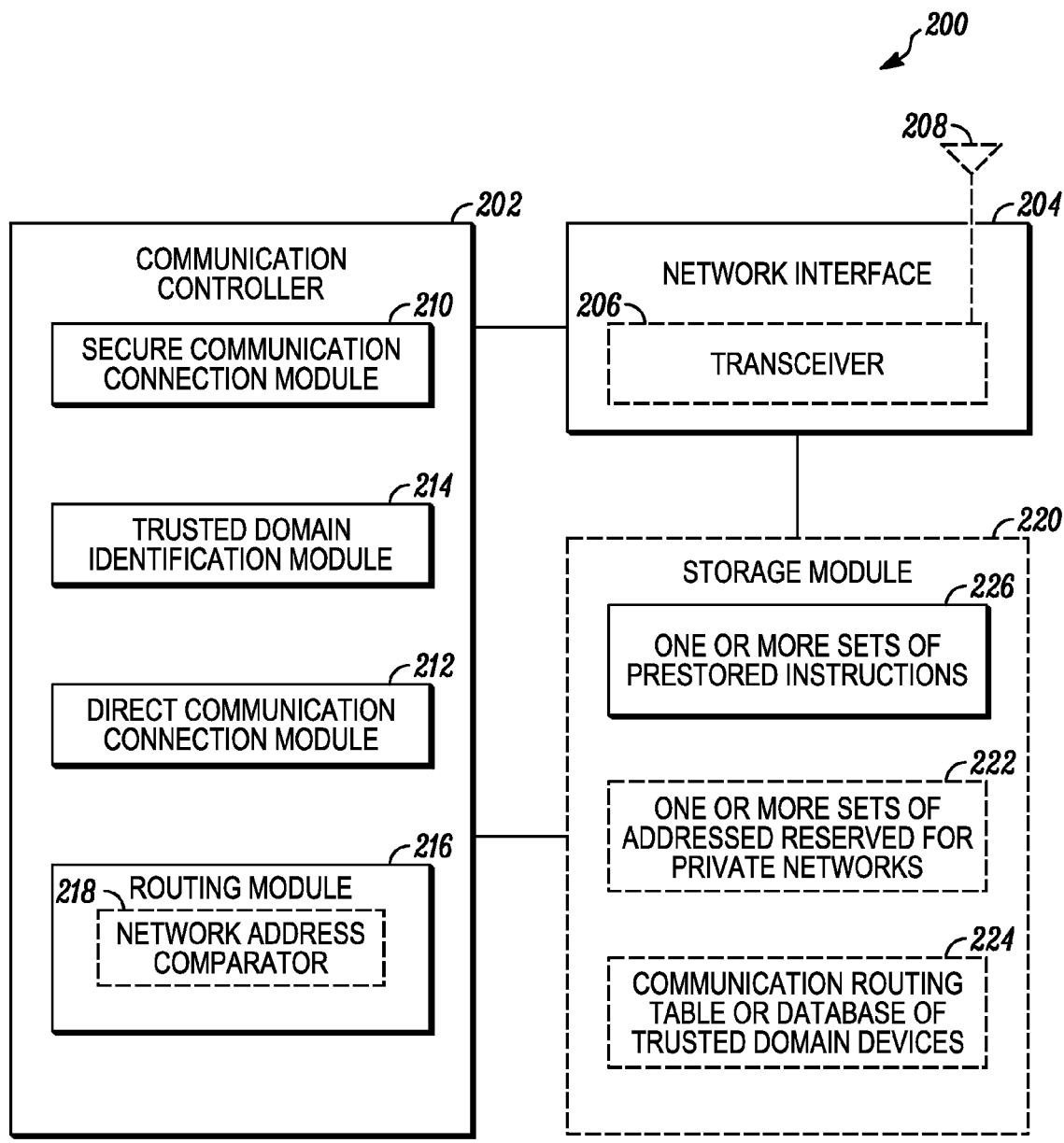
FIG. 2 is a block diagram of a device in a network adapted for managing data communications, in accordance with at least one embodiment of the present invention.

FIG. 2 illustrates a block diagram of a device 200 in a network adapted for managing data communications, where devices that are part of a trusted domain are automatically identified, and the identification is used to route messages to their intended destination via one of a tunnel mode connection or a direct connection dependent upon whether the intended destination is part of the trusted domain. In at least some embodiments the device can correspond to one of the devices described above in connection with the exemplary network environment illustrated in FIG. 1, including the mobile subscriber 102.

The device 200 includes a communication controller 202, and a network interface 204 coupled to the communication controller 202. The network interface 204 facilitates one or more communication connections with a network 100, which allows for the receipt and/or transmission of information between the device 200 and other devices of the network 100. In some instances, the connection can be managed through a wired connection, such as the connection illustrated between the personal computer 114 and the router/modem 112. In other instances, the connection can be managed through a wireless communication connection.

In the illustrated embodiment, the network interface 204 includes a wireless radio transceiver 206, which radiates and receives electromagnetic energy via an antenna 208, which is coupled to the transceiver 206. The transceiver 206 generally incorporates both transmit and receive functions, thereby enabling bi-directional communication. However, if communication in only a single direction is desired, it is alternatively possible for the network interface 204 to include a transmitter or a receiver, in place of the illustrated transceiver 206.

The communication controller 202 of device 200 includes a secure communication connection module 210 for establishing and maintaining a secure communication connection via a tunnel mode connection. As noted above, a tunnel mode connection provides for the encapsulation of the private network information in a public network transmission unit, where the private network data information, as well as the private network protocol information, appears to the public network as data encoded as part of the public network transmission unit, such as a packet. Generally, the private network information is encrypted thereby making access to the information by anyone other than the intended destination more difficult. Upon receipt at the other end of the tunnel, the encapsulated information is extracted and is acted upon as if the information originated at the other end of the tunnel, which in some instances is well within the controlled boundaries of the carrier's network thereby enabling a device, such as a remote mobile subscriber 102, to operate as if the device is operating from within the carrier's network 110, despite the fact that the device is in fact operating outside of the carrier's network 110.

The communication controller 202 of device 200 further includes a direct communication connection module 212, which allows communication originating from the device 200 to bypass the tunnel mode connection, and operate as if the communication is originating from the actual location of the device 200. Because an affiliated carrier, as well as a user of a device 200 has an interest in maintaining the integrity of its network space, as well as the devices allowed to operate within its network space, the conditions in which communications via a direct connection may be allowed by a subscriber device may be somewhat restricted and/or managed by a carrier. In general, a local policy or a policy local to the device will largely define the conditions in which communications which bypass a tunnel mode connection are allowed. More generally, the local policy may help to define the qualities which qualify as a trusted environment both inside and outside of the carrier's controlled portion or zone 110 of the network 100, such that areas outside of the carrier controlled zone 110 might be allowed to be accessible more directly independent of the tunnel mode connection.

A trusted domain identification module 214 of the communication controller 202, taking into account any local policy will automatically identify other devices that are part of a trusted domain, such that they may be accessed more directly. Upon identifying one or more other devices that are local to the device and are part of a trusted domain, a routing module 216 of the communication controller can route data communications via the direct communication connection or the tunnel mode connection, depending upon the intended destination of the communication. In accordance with at least some embodiments, the routing module 216 will make use of a network address comparator 218 to identify which communications to route via the direct communication connection, and which communications to route via the tunnel mode connection. In at least some instances, the routing module 216 will compare the destination address for the communication with addresses contained within a storage module 220 and which are linked to devices contained within a trusted domain, relative to the device 200.

Generally, in accordance with the present invention, the addresses for other devices which are contained within a trusted domain are automatically determined by the device without specific intervention by the user, and may be governed in accordance with a local policy. For example, at least some of the trusted domain devices may be identified by querying a control entity from the carrier portion 110 of the network. In the same and/or other instances some of the trusted domain devices may be identified by the device by polling the local environment, and comparing the network location characteristics of the other devices to a set of conditions used to identify other nearby devices forming part of a local trusted network with the device 200. In some instances, the particular network location characteristics that establish another device as being part of the same local trusted portion of the network may be dependent upon characteristics of the device 200, itself.

For example, different conditions may apply for purposes of defining whether another device is part of a trusted domain, depending upon whether the device 200 is locally coupled to the network via a device providing network address translation, or whether the device 200 has a public or a private network address. Within at least some networks, such as the Internet, there are some blocks 222 of addresses that are reserved for private addresses to be assigned locally within a private network. Generally, in order for these devices to access or be accessed by devices outside of the private network, they need to make use of a public network address. In some instances they may make use of the public address of the router/gateway which serves as an interface between a private portion of the network and a public portion of a network, where through a network address translation device a communication with a particular device can be properly routed. In the example of the Internet at least a couple of blocks of addresses are reserved for private use, examples of private Internet address blocks include a set of addresses having an address corresponding to 10.X.X.X, 172.16.X.X, and/or 192.168.X.X, where X is any number between 0 and 255.

Where the device 200 has a private network address, at least one technique that might be used to identify other devices that are part of the trusted domain includes identifying other devices that similarly have a private network address. In some instances, when device 200 has a private network address, the addresses of other devices that may be considered part of the trusted domain includes devices having a similar network destination address, where the netmask bits of the network destination address are equivalent to the value of a local netmask and the network address destination address is not equal to a network address of the gateway device for routing traffic away from the trusted domain.

Where the device 200 has a private network address, and accesses the public address through a device providing network address translation, in some instances the device providing network address translation might be treated as an external gateway and any other devices having a private address on the same side of the device providing network address translation are treated as being part of the trusted domain, if they similarly have a destination address that is part of a private address block. In other instances it may be acceptable to include devices beyond the device providing network address translation, but within a gateway device for routing traffic away from the trusted domain.

In some instances, the network address for the gateway device for routing traffic away from the trusted domain may be known. In other instances, it may need to be determined. In instances, where the network address for the gateway device used for routing traffic away from the trusted domain needs to be determined for purposes of defining the boundaries of the trusted domain, it may be possible to determine the address through an exploration of the private network paths to the public network. At least one manner of determining the address through an exploration of the private network paths to the public network includes sending test messages to a known non-trusted domain device, by starting with a low number of allowed hops for the test message. An address from a device reporting a routing failure is then collected and compared against the set of public addresses. If the collected address is a public address, then the collected address is the address for the gateway device for routing traffic away from the trusted domain. If the collected address is a private address, then the number of allowed hops for the test message is incremented as part of sending out a new test message, subsequently receiving addresses from devices reporting a routing failure, and then comparing the received address with the set of public addresses until the test message reaches a routing failure reporting device having a public address.

In instances, where the device may have a public address, it may be desirable to define a trusted zone that incorporates more than just the immediately adjacent zone that is maintained or managed by a user. For example, the trusted zone may extend to the network 106 of an Internet service provider, or in the case of the network of a company, to the portion of the network associated with other locations. In such an instance, it may be possible to query an assigned naming authority, such as ICANN (Internet Corporation for Assigned Names and Numbers), which handles IP address space allocation, protocol parameter assignment, domain name system management, and root server system management functions, in order to obtain the range of public addresses, that is part of and/or associated with a common domain authority, such as a particular company or service provider. The retrieved addresses can then serve as a set of addresses for which the tunnel mode connection might be bypassed. Furthermore the set of obtained public addresses might supplement one or more sets of private addresses in support of the routing module in determining whether to bypass the tunnel mode connection.

The obtained or determined addresses can then be used to establish a communication routing table or a database of trusted domain devices 224, which can similarly be stored in storage module 220. In turn, the routing table or database of trusted domain devices 224 could then be used for subsequent routing decisions. Presumably, the routing table or database of trusted domain devices 224, might then be occasionally updated to reflect changes in the network environment. For example, as a device, such as a cellular radio telephone moves from one location to another, a different set of devices might form a trusted domain for which communications via a direct communication connection, which bypasses the tunnel mode connection may be desirable. A more specific example may include a first set of devices forming a trusted domain when a particular device is used by a user in or near the home, and a second set of devices forming a trusted domain when a particular device is used by a user at work.

In at least some embodiments, the communication controller 202 can be implemented at least in part using a microprocessor, which might operate to perform some of the functionality associated with one or more of the associated modules in conjunction with the one or more sets of prestored instructions 226 contained in the storage module 220. The storage module 220 can include one or more forms of volatile and/or non-volatile memory including conventional ROM 221, EPROM 223, RAM 225, or EEPROM 227, as well as other forms of storage including fixed or removable discs. In some instances some or all of the storage module can be maintained separate from the device 200, for example on a server which might be communicatively coupled to the device 200.

While at least some of the functionality associated with one or more of the associated modules can be managed under the direction of one or more sets of prestored instructions, one skilled in the art will readily recognize that the modules can include additional and/or alternative forms, such as sequential station machines and operational logic circuitry, which could be implemented in hardware, software and/or both. To the extent that any portion of the functionality is implemented using hardware elements, the same could be constructed using discrete logic elements, gate array or programmable logic array type structures, and/or could be implemented in a VLSI type structure, without departing from the teachings of the present invention.

Figure 3:
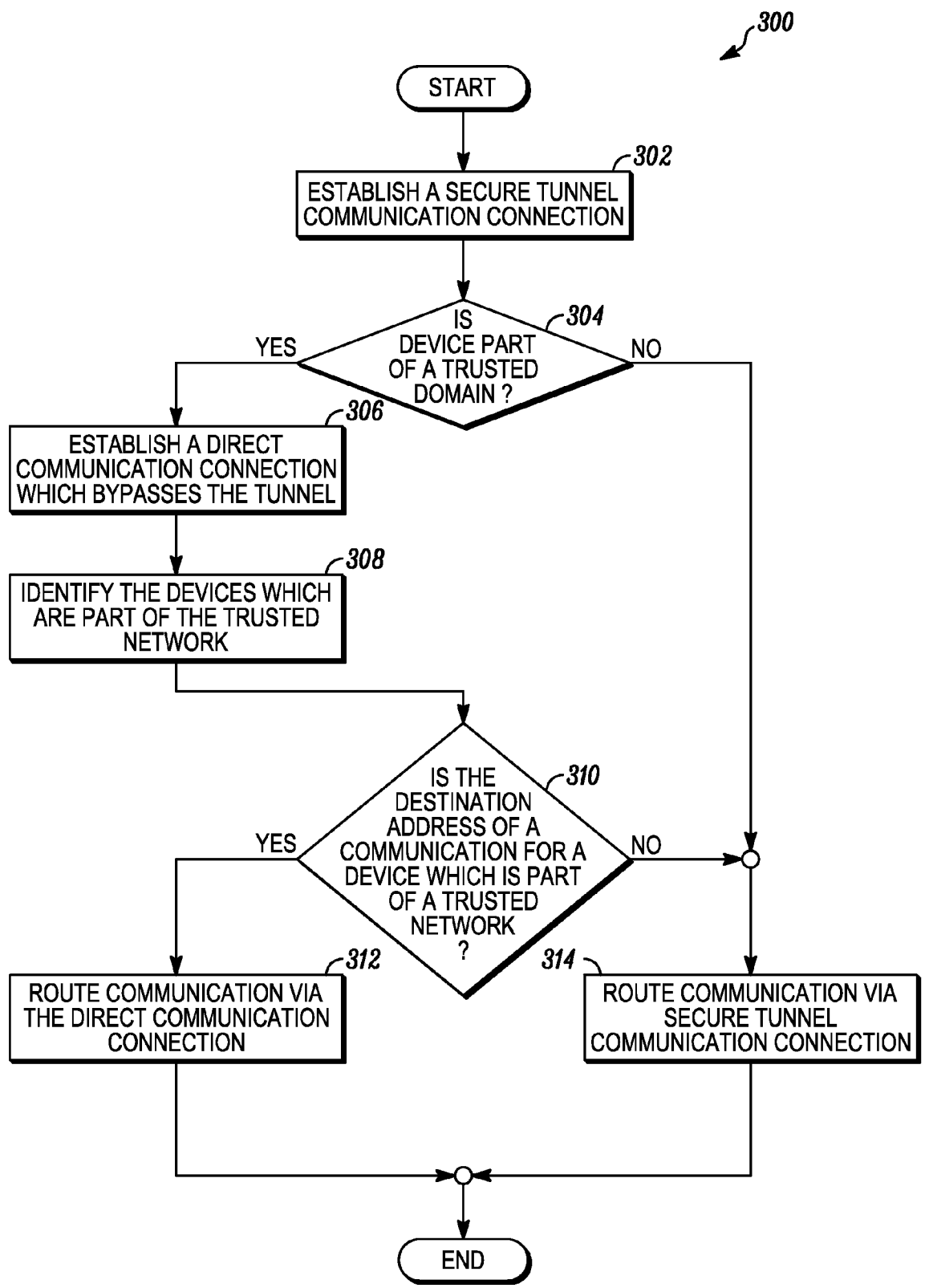
FIG. 3 is a flow diagram of a method for managing data communications of a device in a network, in accordance with at least one embodiment of the present invention.

FIG. 3 illustrates a flow diagram 300 of a method for managing data communications of a device in a network, in accordance with at least one embodiment of the present invention. The method includes establishing 302 a secure tunnel communication connection. A determination 304 is then made as to whether the device is part of a trusted domain. If the device is part of a trusted domain, a direct communication connection, which bypasses the tunnel communication connection is established 306, and the device which are part of the trusted network are identified 308. A determination 310 is then made as to whether the destination address of a particular communication is for a device that is part of the trusted network. If the destination address of the communication is for a device that is part of the trusted network, then the communication is routed 312 via the direct communication connection. If the device is not part of a trusted domain, or the destination address of a communication is not for a device which is part of the trusted network, then the communication is routed 314 via the secure tunnel communication connection.

Figure 4:
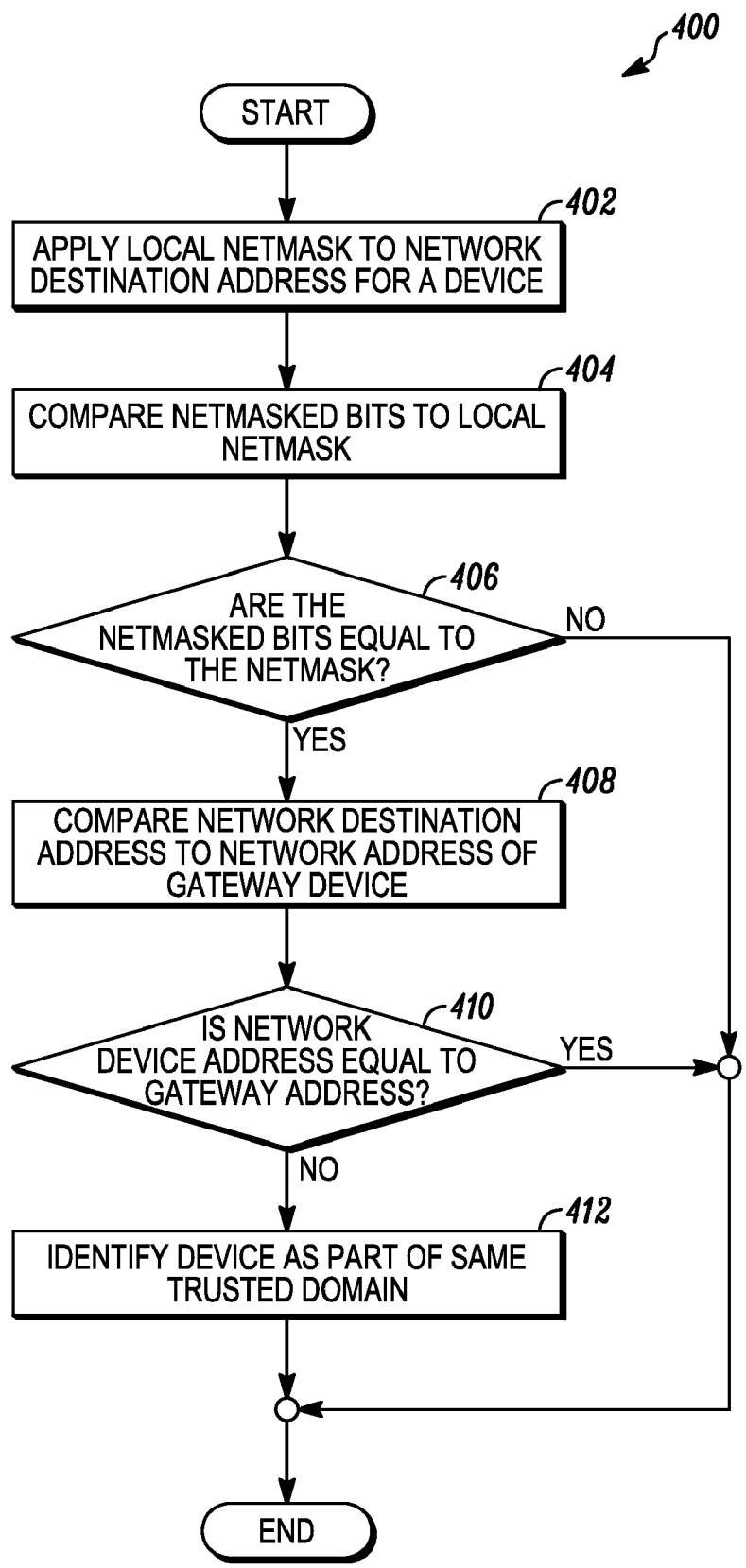
FIG. 4 is a flow diagram of a method for determining the devices that are part of the same trusted domain, in accordance with at least one aspect of the present invention.

FIG. 4 illustrates a flow diagram 400 of one of the above noted methods for determining whether one or more of the devices that are part of the same trusted domain. The method includes applying 402 a local netmask to a network destination address for a device. The netmasked bits are then compared 404 to the local netmask. A determination 406 is then made as to whether the netmasked bits are equal to the netmask. If the netmasked bits are equal to the netmask, then the network destination address is compared 408 to the network address of the gateway device. If the netmasked bits of a network device address are equal to the netmask, and the network device address is not equal to the gateway address, then the device is identified 412 as being part of the same trusted domain. If the netmasked bits of the network device address are not equal to the netmask, or the network device address is equal to the gateway address, then the device is not identified as being part of the same trusted domain.

Figure 5:
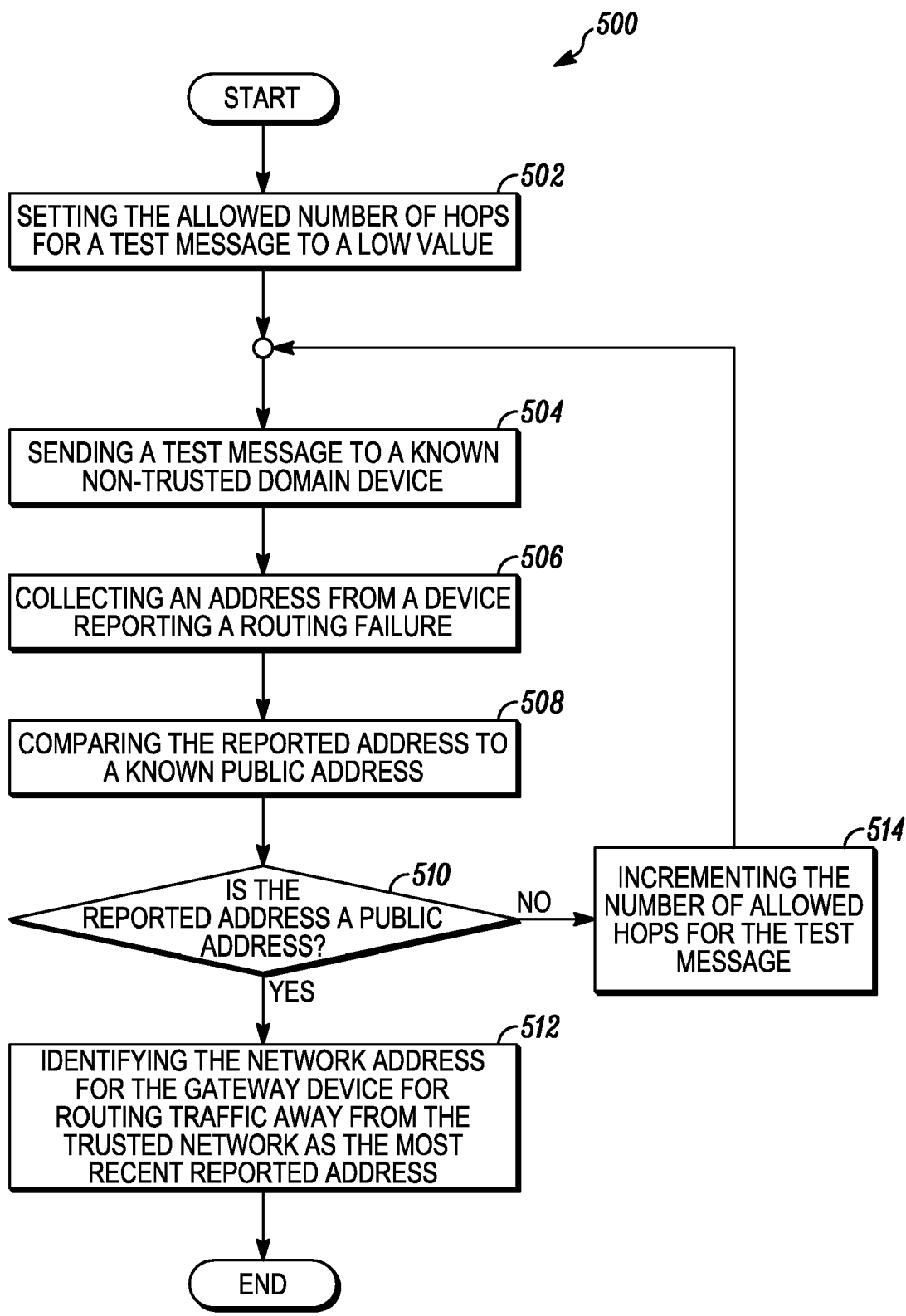
FIG. 5 is a flow diagram of a method for determining the identity of the network address for the gateway device for routing traffic away from the trusted network, in accordance with at least one aspect of the present invention.

FIG. 5 illustrates a flow diagram 500 of a method for determining the identity of the network address for the gateway device for routing traffic away from the trusted network, in accordance with at least one aspect of the present invention. The method includes setting 502 an allowed number of hops for a test message to a low value. In at least some instances, the number of hops may be initially set to one. However where more than one hops are known to be necessary for reaching the gateway device, which routes communication traffic away from the trusted network, a higher number of hops could be set for the initial test message.

A test message is then sent 504 to a device which is known to be part of a non-trusted domain, but for which there is an insufficient number of hops to reach the destination. An address from a device reporting a routing failure is then collected 506. The reported address is then compared 508 to known public addresses. A determination 510 is then made as to whether the reported address is a public address. If the reported address is a public address, then the most recent reported address is identified 512 as being the network address for the gateway device for routing traffic away from the trusted network. If the reported address is not a public address, then the number of allowed hops for the test message is iteratively incremented 514, as part of sending 504 a further test message to a known non-trusted domain device, an address from the device reporting a routing failure is then collected 506, and the reported address is compared 508 to a known public address.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for managing data communications of a device in a network, the method comprising:
    establishing a secure communication connection for the device with a service provider via a tunnel mode connection;
    determining if the device is part of a trusted domain including one or more other devices, wherein the devices that are part of the same trusted domain include devices that have a network destination address where netmask bits of the network destination address are equivalent to the value of a local netmask and the network destination address is not equal to a network address of a gateway device for routing traffic away from the trusted domain;
    if the device is part of a trusted domain including one or more other devices, then establishing a direct communication connection, which bypasses the tunnel mode connection for only the devices that are part of the same trusted domain; and
    routing communications with any devices which are not part of the same trusted domain via the tunnel mode connection.

2. A method for managing data communications of a device in a network, in accordance with claim 1, wherein the network address for the gateway device for routing traffic away from the trusted domain includes
    sending a test message to a known non-trusted domain device, by starting with a low number of allowed hops for the test message,
    collecting an address from a routing failure reporting device failing to route the message to the known non-trusted domain device in the allowed number of hops,
    determining if the address of the routing failure reporting devices is a public address, and
    iteratively increasing the number of allowed hops as part of sending a new test message, collecting an address from a routing failure reporting device, and determining if the address of the routing failure reporting device is a public address, until the test message reaches a routing failure reporting device having a public address.

3. A method for managing data communications of a device in a network, in accordance with claim 1, wherein the trusted domain includes the devices on the same local private network.

4. A device in a network comprising:
    a network address;
    a network interface; and a communication controller coupled to the network interface, the communication controller including
- a secure communication connection module for establishing a secure connection via a tunnel mode connection with a service provider via a network infrastructure;
- a trusted domain identification module for identifying any other devices that form a part of a trusted domain with the device, wherein the devices that are part of the same trusted domain include devices that have a network destination address where netmask bits of the network destination address are equivalent to the value of a local netmask and the network destination address is not equal to a network address of a gateway device for routing traffic away from the trusted domain;
- a direct communication connection module for establishing a direct connection which bypasses the tunnel mode connection for communicating with any destination devices that are part of the same trusted domain; and
- a routing module for alternatively routing any communication with the network via the secure communication connection and the direct communication connection dependent upon whether the destination device is part of the same trusted domain.

5. A device in accordance with claim 4, wherein the network infrastructure includes a gateway, defining the boundary between a local private portion of the network and a public portion of the network, through which the device communicates for access to the public portion of the network.

6. A device in accordance with claim 4 further comprising a storage module including one or more sets of addresses that are reserved for private networks.

7. A device in accordance with claim 6 wherein the routing module of the communication controller includes a network address comparator.

8. A device in accordance with claim 7 wherein the network address comparator is adapted for comparing a network address identified for other devices in the network with addresses that are reserved for private networks.

9. A device in accordance with claim 7 wherein the network address comparator is adapted for comparing the netmask bits of a network address identified for other devices in the network to a local netmask and comparing the network address identified for other devices in the network to a network address of a gateway device for routing traffic away from the trusted domain.

10. A device in accordance with claim 4 wherein the device is a wireless communication device.

11. A device in accordance with claim 10 wherein the wireless communication device is a cellular radio telephone.

* * * * *